Figure 1:
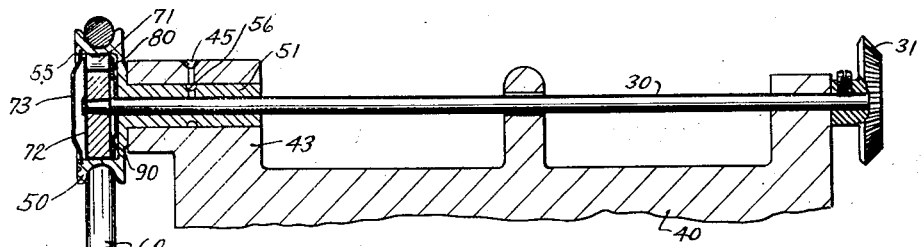

Oct. 10, 1933.   W. E. SHERBONDY   1,929,454
COMBINED CLUTCH AND DRIVING PULLEY
Filed March 15, 1930   2 Sheets-Sheet 1

Inventor
William E. Sherbondy,
By Bates, Golrick & Fears,
Attorneys.

Oct. 10, 1933.    W. E. SHERBONDY    1,929,454
COMBINED CLUTCH AND DRIVING PULLEY
Filed March 15, 1930    2 Sheets-Sheet 2

Inventor
William E. Sherbondy,
By Watts, Golrick & Tear
Attorneys

Patented Oct. 10, 1933

1,929,454

UNITED STATES PATENT OFFICE 1,929,454

COMBINED CLUTCH AND DRIVING PULLEY

William E. Sherbondy, Shaker Heights, Ohio

Application March 15, 1930, Serial No. 436,227, and in Belgium March 29, 1926

3 Claims. (Cl. 192—45)

My Patent No. 1,750,944 for a Carpet sweeper issued March 18th, 1930, which was filed September 23rd, 1925, Serial No. 58,066 (of which this application is a continuation as to all matter common to the two applications) shows a carpet sweeper of substantially standard form but having incorporated with it a suction fan mounted horizontally over the brush and driven by the traction wheels of the sweeper. The driving mechanism as there shown includes a horizontal shaft connected by beveled gearing with the vertical fan shaft, a freely rotatable pulley embracing the horizontal shaft and receiving a belt from the traction drive, and a clutch located within the pulley for coupling it with the horizontal shaft for one direction of rotation only.

The present invention relates to such combined clutch and pulley, both as set out in my prior application referred to, and in combination with an additional feature herein shown for insuring engagement of the clutch rollers with the pulley under certain abnormal conditions.

My invention is illustrated in the drawings hereof, and is hereinafter more fully described, and the essential characteristics are set out in the claims.

Figure 2:
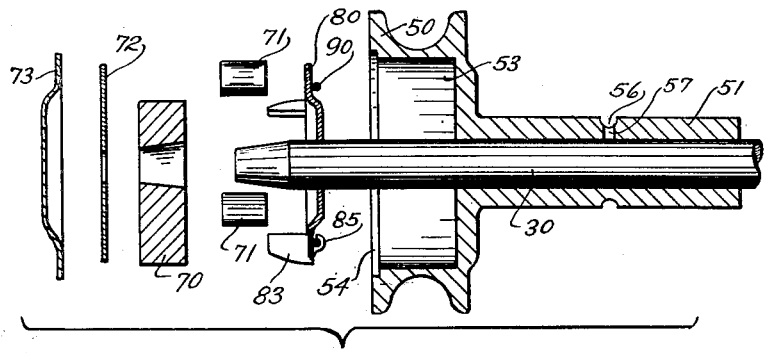
Figure 3:
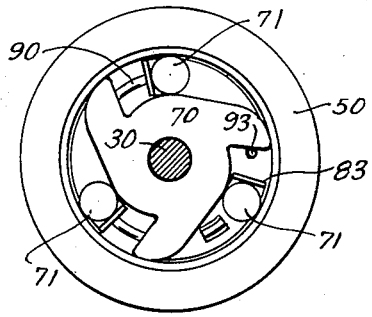
Figure 4:
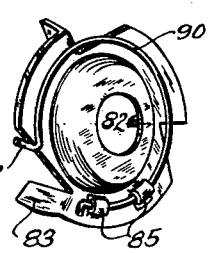
Figure 5:
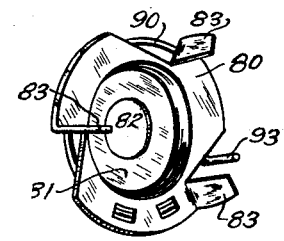
Figure 6:
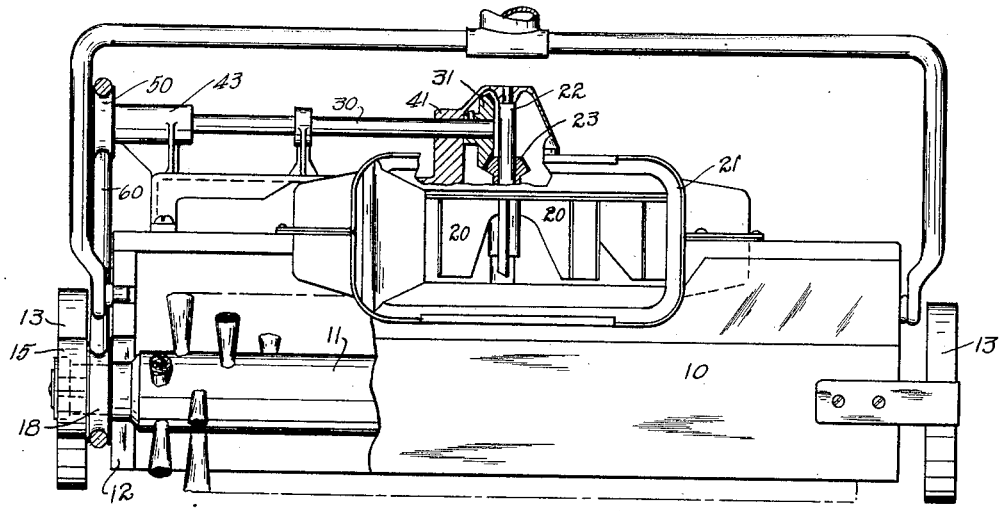
Figure 7:
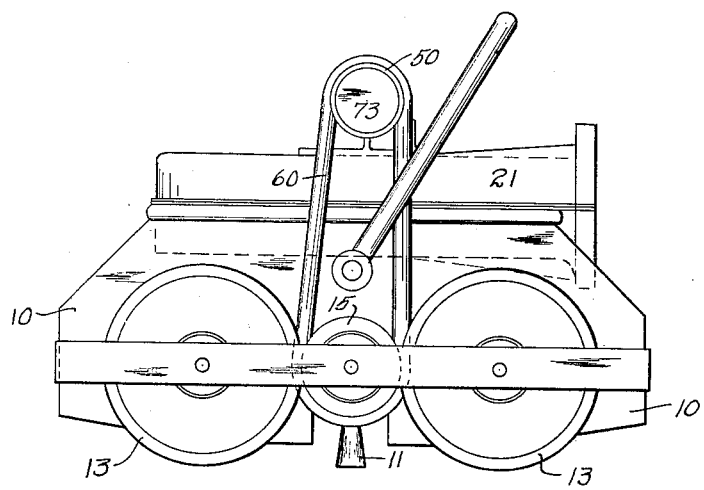

In the drawings Fig. 1 is a vertical axial section through the clutch and pulley showing the horizontal driven shaft; Fig. 2 is a dis-assembled view in sectional elevation of the pulley and clutch parts and the end portion of the shaft; Fig. 3 is a face view of the pulley and clutch with the retaining washer and dust cap removed; Figs. 4 and 5 are perspectives from opposite sides of the added device for insuring engagement of the clutch rollers; Fig. 6 is a side elevation partly broken away of a carpet sweeper having my clutch pulley; Fig. 7 is an end elevation of the same.

As shown in Figs. 6 and 7, 10 indicates a carpet sweeper casing, 11 a brush rotatably mounted in vertical slots 12 in the end walls of the casing, and 13 four traction wheels on the ends of the casing. Each pair of traction wheels frictionally engage an intermediate wheel 15 on the brush to drive it backward or forward as the sweeper is reciprocated.

The fan, designated 20, is contained in a casing 21 set into the top of the carpet sweeper casing. This fan is mounted on a vertical shaft 22 which has a bevel gear 23 meshing with a bevel gear 31 on the horizontal shaft 30. This horizontal shaft has a bearing in an upright ear 41 of a casting 40 secured to the top of the carpet sweeper casing. Near its other end, this casting has an upwardly projecting ear 43 in which is journalled a hollow hub 51 of the pulley 50, the shaft 30 extending freely through this hollow hub. The pulley is connected by a belt 60 with a pulley 18 on the projecting portion of the brush just outside of the carpet sweeper casing. The pulley is connectable with the shaft by my special clutch mechanism, which will now be specifically described with reference to Figs. 1 to 5.

Within the pulley 50 is a cylindrical recess 53. Within this recess and rigid on the shaft 30 is a multi-lobed clutch member 70. This member is shown as having three lobes, the outer face of each of which gradually approaches the cylindrical face of the cavity 53. In the wedge-shaped regions between the clutch member 70 and the cylindrical wall of the pulley are a corresponding number of rollers 71, three being shown. The wedge-shaped cavities are so shaped that when the rollers are in the deepest portion of the cavities, they do not form a binding contact between the clutch member 70 and the pulley. When however, the pulley is turned in the driving direction (clockwise in Fig. 3) it carries the rollers along the approaching surface of the clutch member into binding engagement and thereby drives the clutch member and shaft with the pulley. An opposite rotation of the pulley is idle.

A suitable plate is provided to hold the rollers in place, for instance, I may mount a washer 72 rigidly on the shaft on the outer side of the clutch member 70 and overhanging the rollers. A convenient arrangement is to taper the end portion of the shaft, make the opening through the clutch member correspondingly tapered so that the clutch member is tight on the shaft, and then the washer is put in place and the shaft riveted over the washer.

It will be noticed that the clutch rollers 71 are materially greater in axial dimension than diametrically. This insures the rollers remaining with their axes substantially parallel with the axis of the shaft.

If desired, a dust cap may be employed. Such member is shown in the form of a dished plate 73 which is set into a rabbet 54 in the clutch pulley and held in place by slightly peened inward ears of the pulley, as indicated at 55 in Fig. 1.

The construction above described, is the same as shown in my prior application, except for the immaterial difference that the clutch member is there secured to a shaft by a pin driven through the clutch member and diametrically through the shaft.

The clutch member and the rollers are of hardened steel, while I make the pulley of ordinary machine steel; the result being that the wear comes on the pulley where the surface is much larger and where the rollers contact with different regions upon successive engagements.

The clutch pulley described has been found to be very satisfactory in ordinary operation. It is desirable to oil the bearing of the pulley hub in the frame ear 43 and also to oil the bearing of the shaft 30 in the pulley hub. To effect this, I prefer to make an annular groove 56 about the pulley hub and provide a radial hole 57 (Fig. 2) leading therefrom to the shaft, and I provide a hole 45 in the frame ear 43 registering with the groove. The oil supplied through the hole 45 will oil the bearing of the hub in the frame and the shaft in the hub. Now, it has been found that occasionally one employs too thick an oil or too much oil and the same gradually passing along the shaft may accumulate in the roller cavities of the clutch and tend to cause the rollers to stick in the deeper regions of the wedge-shaped cavities, so that occasionally under these circumstances, the rollers because they are so small and light do not properly engage and the clutch fails to act in an efficient manner.

To remedy the difficulty mentioned, I have provided a device, now first shown, which keeps the rollers away from the very ends of the cavities where the oil might accumulate and presses them by a light spring pressure in the binding direction but not far enough to cause them to bind. This device is illustrated in Figs. 1 to 5 and will now be specifically described.

The "anti-sticking device" comprises a sheet metal dish-shaped member 80 and the spring 90 carried thereby. The member 80 is a circular plate centrally dished at 81 and having a central opening 82 adapted to loosely surround the shaft. The member is provided with three ears 83 turned outwardly at right angles, the same being cut from the marginal portion of the member. The spring 90 comprises a wire anchored to the member 80 by means of a pair of ears 85 of that member, which are cut out from the marginal portion and rolled over on the wire as shown in Fig. 4. This wire extends arcuately about the outside of the dished portion 81 for the major portion of a circumference and is then turned in the same direction as the ears so that it has a free projecting end 93.

When the device just described is in place, it occupies the base portion of the pulley recess 53 loosely surrounding the shaft. The free end of the spring 93 lies against one of the lobes of the clutch member 70 at the deepest region of one of the wedge-shaped cavities and the three ears 83 project into the three cavities just behind the three rollers 71. In this position, the spring 90 is slightly constrained and thus tends to move the member 80 rotatably so that the ears 83 shove the rollers into a more reduced region of the wedge-shaped cavities. The spring is light enough so that it cannot cause the rollers to bind against the pulley; it does however maintain the rollers elastically in position so they are just ready to engage the pulley, and gives a yielding backing to them which prevents any accumulated oil from retaining any of the rollers in non-active portions of their cavities. When the pulley rotates in the idle direction, it passes freely across the rollers, carrying them back against the spring resisted shoulders 83. The rollers however, are always in position so that upon the pulley rotating in the driving direction, the rollers form effective transmission members, immediately binding the pulley to the clutch member 70 and thereby driving the fan.

It will be seen that my clutching pulley, both in its original form and with its anti-sticking device, is adapted for embodiment in a very simple compact construction. The entire clutch is retained within the pulley itself and hidden by the dust cap, the result being a neat device, very effective in operation and not liable to get out of order.

I claim:

1. In a device of the character described, the combination of a pulley having a cylindrical recess, a shaft extending into the recess, a clutch member on the shaft within the recess and having a plurality of lobes with peripheral surfaces gradually approaching the cylindrical surfaces of the recess providing wedge-shaped cavities between the clutch member and pulley wall, rollers in said wedge-shaped cavities, the end portion of the shaft being tapered and the clutch member being correspondingly tapered to make a tight fit on the shaft, and a washer on the end portion of the shaft within the recess and outside of the clutch member and overlapping the rollers, the end of the shaft being riveted over the washer.

2. The combination of a pulley having a cylindrical recess, a shaft extending into the recess, a clutch member on the shaft within the recess having a plurality of peripheral portions gradually approaching the wall of the recess to provide wedge-shaped cavities, rollers occupying said cavities, a disk surrounding the shaft between the clutch member and the base of the pulley recess, said disk having ears projecting into the wedge-shaped cavities and adapted to engage the rollers, and an arcuate spring anchored to the disk and having a free portion engaging the clutch member.

3. The combination of a pulley having a cylindrical recess opening to one side, a shaft extending into the recess, a lobated clutch member on the shaft within the recess leaving wedge-shaped cavities between its periphery and the wall of the recess, rollers occupying said cavities, a dished-plate surrounding the shaft between the clutch member and the base of the pulley cavity, said plate having outwardly turned ears projecting into the wedge-shaped cavities respectively and adapted to engage the rollers, and an arcuate spring anchored to the disk and having an outwardly turned end engaging one of the lobes of the clutch member.

WILLIAM E. SHERBONDY.